(12) United States Patent
Takata

(10) Patent No.: US 11,799,178 B2
(45) Date of Patent: Oct. 24, 2023

(54) LIQUID INJECTION DEVICE

(71) Applicant: AESC Japan Ltd., Kanagawa (JP)

(72) Inventor: Koichi Takata, Zama (JP)

(73) Assignee: AESC Japan Ltd., Kanagawa (JP)

( * ) Notice: Subject to any disclaimer, the term of this patent is extended or adjusted under 35 U.S.C. 154(b) by 458 days.

(21) Appl. No.: 16/644,716

(22) PCT Filed: Sep. 15, 2017

(86) PCT No.: PCT/JP2017/033394
§ 371 (c)(1),
(2) Date: Mar. 5, 2020

(87) PCT Pub. No.: WO2019/053867
PCT Pub. Date: Mar. 21, 2019

(65) Prior Publication Data
US 2020/0287198 A1    Sep. 10, 2020

(51) Int. Cl.
*H01M 50/609* (2021.01)
*H01M 50/60* (2021.01)
*H01M 10/38* (2006.01)

(52) U.S. Cl.
CPC ......... *H01M 50/609* (2021.01); *H01M 10/38* (2013.01); *H01M 50/60* (2021.01); *Y02E 60/10* (2013.01); *Y02P 70/50* (2015.11)

(58) Field of Classification Search
CPC ........ Y02P 70/50; Y02E 60/10; H01M 10/38; H01M 50/60; H01M 50/609
USPC ....................................................... 141/1.1
See application file for complete search history.

(56) References Cited

FOREIGN PATENT DOCUMENTS

| CN | 201450055 | * | 5/2010 | ............ Y02E 60/10 |
|---|---|---|---|---|
| JP | H08-130004 A | | 5/1996 | |
| JP | H09-167612 A | | 6/1997 | |
| JP | 2008-204649 A | | 9/2008 | |
| JP | 2012-064468 A | | 3/2012 | |

OTHER PUBLICATIONS

English language machine translation of "A vacuum liquid injection device" by Shaoyi Chen in CN201450055 (Year: 2010).*
International Search Report issued in corresponding International Patent Application No. PCT/JP2017/033394 dated Nov. 7, 2017.

* cited by examiner

*Primary Examiner* — Jonathan G Jelsma
*Assistant Examiner* — Omar M Kekia
(74) *Attorney, Agent, or Firm* — Morgan, Lewis & Bockius LLP

(57) ABSTRACT

The present disclosure provides a liquid injection device for injection of electrolytic solution into a bag-shaped film exterior containing a generation element.

15 Claims, 8 Drawing Sheets

LIQUID INJECTION DEVICE

TECHNICAL FIELD

The present invention relates to a liquid injection device including a nozzle to be inserted in a bag-shaped laminate film exterior, wherein gas inside the bag-shaped laminate film exterior is evacuated through the nozzle.

BACKGROUND ART

Patent Document 1 discloses a liquid injection device including an evacuation nozzle to be inserted in an opening of a laminate sheet bag containing a generation element, for producing a vacuum in the laminate sheet bag.

The liquid injection device according to Patent Document 1 includes the evacuation nozzle separately from a liquid injection nozzle. These nozzles are inserted in the opening of the laminate sheet bag.

In case that the evacuation is implemented with a tip of the evacuation nozzle relatively apart from the generation element, the liquid injection device may cause insufficient evacuation in the laminate sheet bag due to adhesion between laminate sheets in a region between the evacuation nozzle tip and the generation element.

Alternatively, in case that the evacuation is implemented with the evacuation nozzle tip inserted deeply to reach a vicinity of the generation element, the laminate sheet bag may deteriorate in sealability because the evacuation nozzle after the evacuation needs to be extracted through a long distance with the evacuated nozzle pressed by a pair of seal blocks.

In view of the foregoing problem, it is desirable to provide a liquid injection device structured to certainly evacuate gas inside a bag-shaped film exterior.

PRIOR ART DOCUMENT(S)

Patent Document(s)

Patent Document 1: JP 2012-64468 A

SUMMARY OF THE INVENTION

According to one aspect of the present invention, an inner circumferential nozzle is structured to have a suction port open at a position protuberant with respect to a liquid injection port of an outer circumferential nozzle in an axial direction of the outer circumferential nozzle, in a state that the inner circumferential nozzle is expanded.

According to one aspect of the present invention, the inner circumferential nozzle is expanded inside a bag-shaped film exterior. This serves to certainly evacuate gas inside the bag-shaped film exterior.

MODE(S) FOR CARRYING OUT THE INVENTION

The following describes an embodiment of the present invention, with reference to the drawings.

Figure 1:
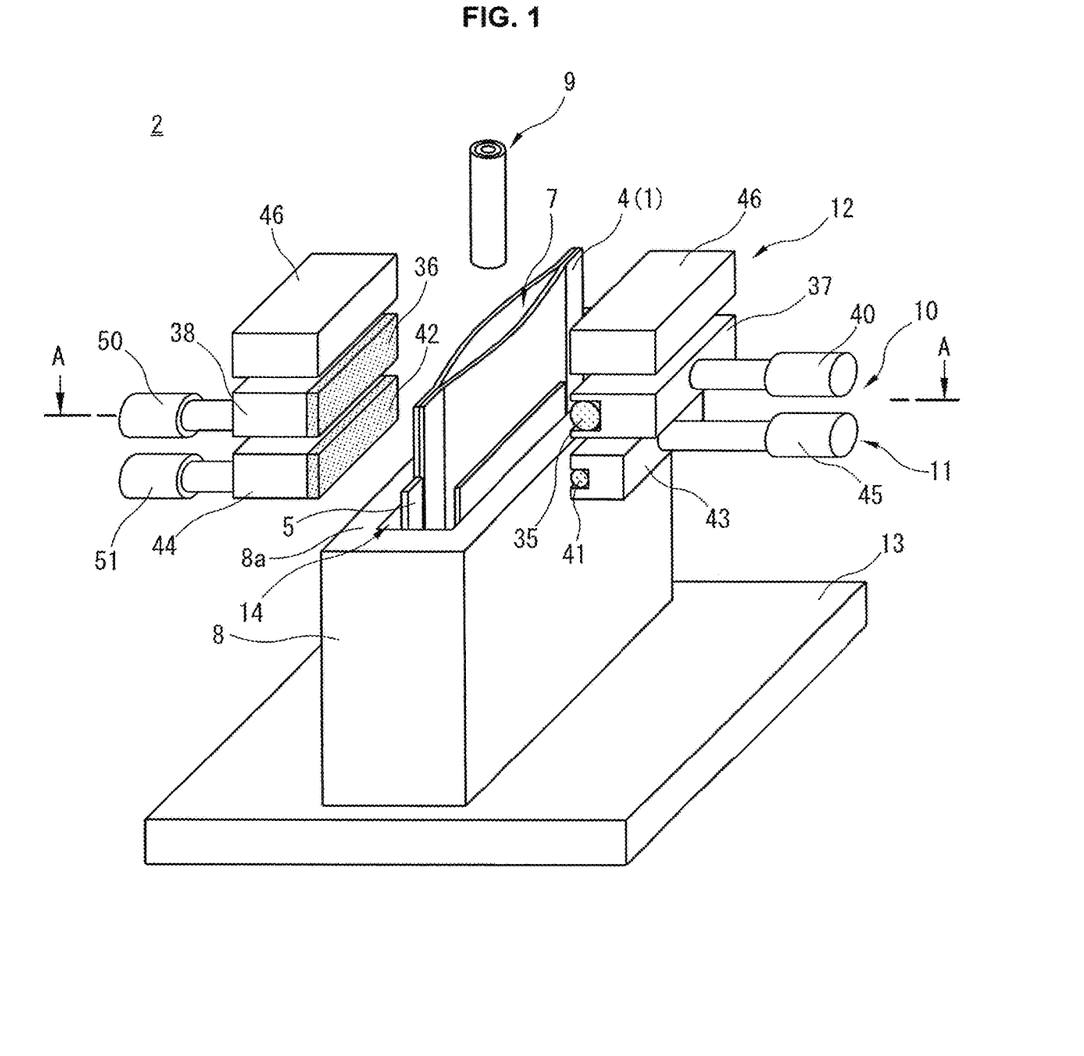
FIG. 1 is a perspective view of a liquid injection device according to an embodiment.

FIG. 1 shows a liquid injection device 2 structured to inject electrolytic solution into a film exterior battery 1. The film exterior battery 1 is exemplarily a lithium ion secondary battery, and includes a generation element 3, a bag-shaped laminate film exterior 4, a cathode tab 5, and an anode tab 6 (see FIG. 2). The generation element 3 has a rectangle shape, and includes a stack of: a cathode and an anode being electrodes not shown; and a separator not shown which is interposed between the cathode and the anode. The bag-shaped laminate film exterior 4 is structured to contain the generation element 3 together with the electrolytic solution. Each of the cathode tab 5 and the anode tab 6 is connected to the bag-shaped laminate film exterior 4.

Figure 2:
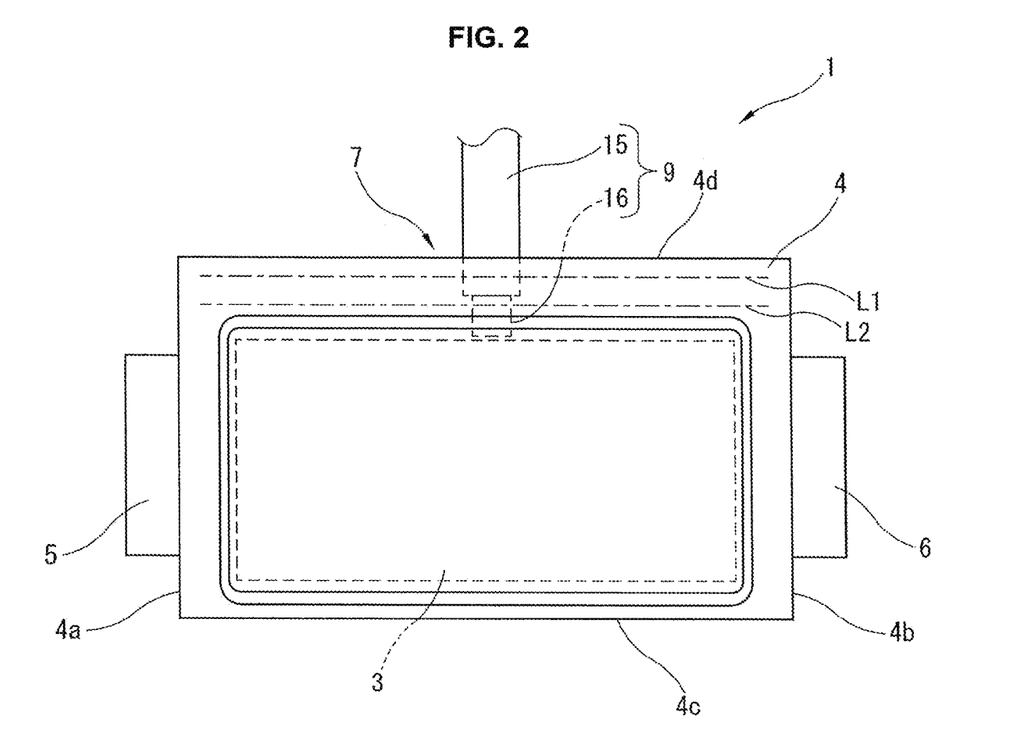
FIG. 2 is an illustrative view of a bag-shaped laminate film exterior with a nozzle inserted therein.

The following further describes the bag-shaped laminate film exterior 4 to which liquid injection is implemented. As shown in FIG. 2, the bag-shaped laminate film exterior 4 is formed by: superposing two rectangle laminate films to each other such that the cathode tab 5 and the anode tab 6 are led outside respectively from a side 4a and a side 4b parallel with the side 4a; and then heat-welding the side 4a, the side 4b, and a side 4c respectively. In this state that the sides 4a, 4b, and 4c have been respectively heat-welded, an opening 7 for the injection of electrolytic solution is formed at an upper side 4d. The electrolytic solution is to be injected via the opening 7, into the bag-shaped laminate film exterior 4 containing the generation element 3.

The liquid injection device 2 includes a presser jig 8, a nozzle 9, a primary seal mechanism 10, a secondary seal mechanism 11, and a heat seal mechanism 12. The presser jig 8 is structured to hold the bag-shaped laminate film exterior 4 including the opening 7. The nozzle 9 is structured to be used in evacuation of the bag-shaped laminate film exterior 4 and in injection of the electrolytic solution into the bag-shaped laminate film exterior 4. The primary seal mechanism 10 is structured to press the opening 7 of the bag-shaped laminate film exterior 4 from both sides of the bag-shaped laminate film exterior 4, with the nozzle 9 inserted in the opening 7. The secondary seal mechanism 11 is structured to seal the opening 7 after the liquid injection of electrolytic solution. The heat seal mechanism 12 is structured to heat-seal the opening 7 after the liquid injection.

The presser jig 8 is disposed below the primary seal mechanism 10, the secondary seal mechanism 11, and the heat seal mechanism 12, and is mounted on a presser jig fixing base 13. The presser jig 8 exemplarily has a cuboid shape, and includes an insertion hole 14 in which the bag-shaped laminate film exterior 4 is inserted in an attitude that the opening 7 opens upward. As shown in FIG. 1, in a state that the bag-shaped laminate film exterior 4 is inserted in the insertion hole 14, the bag-shaped laminate film exterior 4 has an upper part projecting upward from an upper surface 8a of the presser jig 8. The primary seal mechanism 10, the secondary seal mechanism 11, and the heat seal mechanism 12 are structured to act on the upper part of the bag-shaped laminate film exterior 4.

Figure 3:
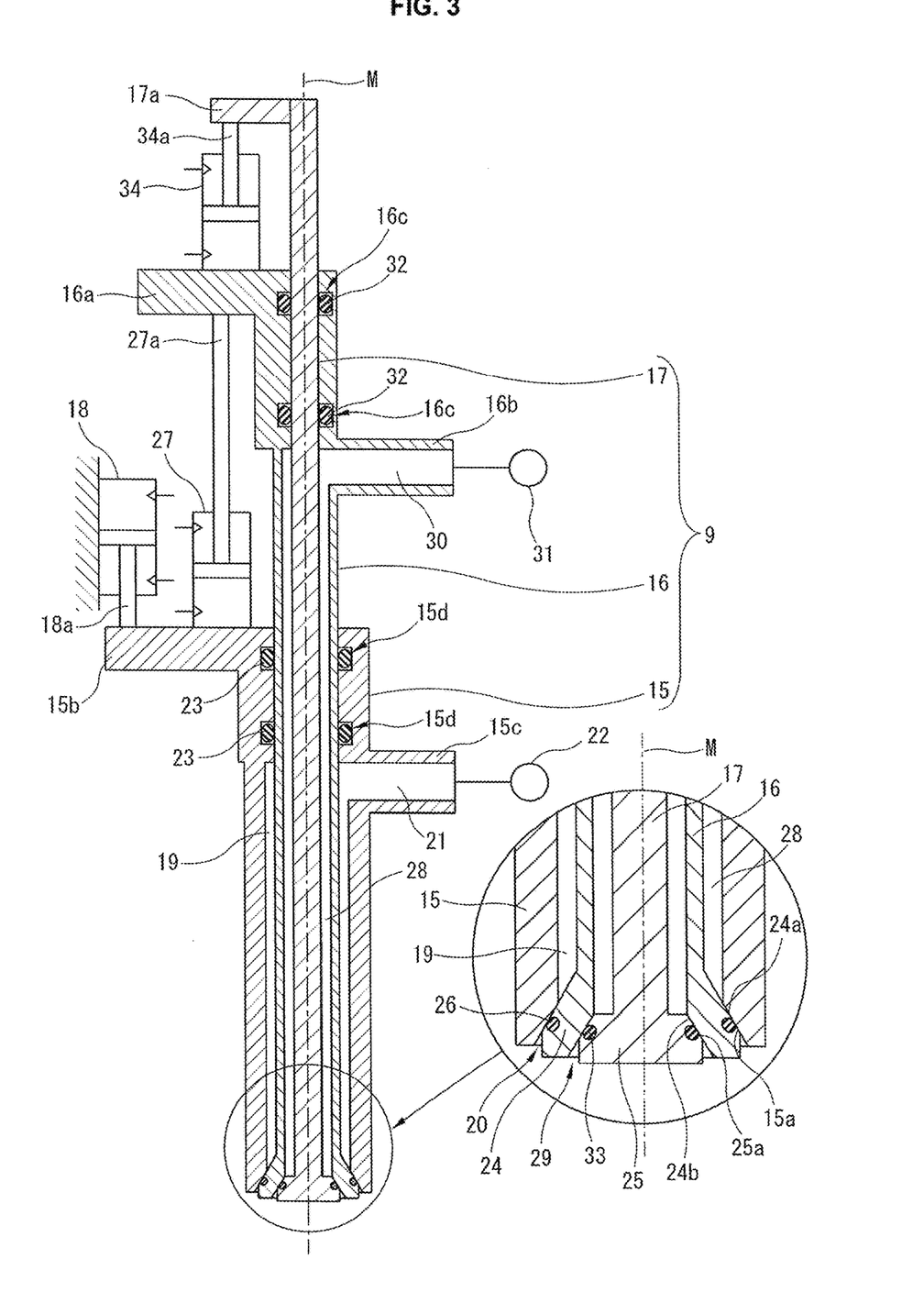
FIG. 3 is a longitudinal sectional view of the nozzle along its axis.

The nozzle 9 is structured movable upward and downward, and, as shown in FIG. 3, includes an outer circumferential nozzle 15, an inner circumferential nozzle 16, and a shaft 17. The outer circumferential nozzle 15 has a cylindrical tubular shape. The inner circumferential nozzle 16 similarly has a cylindrical tubular shape, and is structured expandable telescopically through the outer circumferential nozzle 15. The shaft 17 has a cylindrical shape, and is structured expandable telescopically through the inner circumferential nozzle 16.

The outer circumferential nozzle 15, the inner circumferential nozzle 16, and the shaft 17 have a common central axis M shown as a dash-dot line in FIG. 3. In the following description, a direction of the central axis M is referred to as "axial direction" for convenience of explanation. Furthermore, a lower end side in the axial direction in FIG. 3 is referred to as "first end side in the axial direction", and an upper end side in the axial direction in FIG. 3 is referred to as "second end side in the axial direction".

The outer circumferential nozzle 15 has an inner diameter greater than an outer diameter of the inner circumferential nozzle 16, so as to form an electrolytic solution passage 19 between the outer circumferential nozzle 15 and the inner circumferential nozzle 16 structured to expand and contract through the outer circumferential nozzle 15. The electrolytic solution passage 19 has an annular shape, through which the electrolytic solution flows. In a state that the inner circumferential nozzle 16 is expanded, the electrolytic solution passage 19 has an outlet in the first end side in the axial direction, namely, a liquid injection port 20. The liquid injection port 20 has an annular shape, and is formed between a tip of the outer circumferential nozzle 15 and an outer periphery of the inner circumferential nozzle 16. The inner circumferential nozzle 16 includes in its tip a diameter expansion portion 24 serving as a valve. Accordingly, the liquid injection port 20 is opened and closed due to relative move between the outer circumferential nozzle 15 and the inner circumferential nozzle 16. The inner circumferential nozzle 16 includes an electrolytic solution sealing member 26 that has an annular shape and is structured to, in a state that the liquid injection port 20 is closed as shown in FIG. 3, fluid-tightly seal a gap between a slope 15a of the outer circumferential nozzle 15 and an outer peripheral slope 24a of the inner circumferential nozzle 16. The slope 15a is formed in the first end side in the axial direction, as a diameter expansion portion tapered in a conical shape. The outer peripheral slope 24a is formed in the diameter expansion portion 24 in the tip of the inner circumferential nozzle 16. The electrolytic solution sealing member 26 is made of elastic material such as rubber, and is disposed in an annular groove formed in the outer peripheral slope 24a.

The electrolytic solution passage 19 extends from the liquid injection port 20 to the second end side in the axial direction, so as to communicate with an electrolytic solution supply passage 21. The electrolytic solution supply passage 21 is defined by a projection 15c having a tubular shape projecting from an outer periphery of the outer circumferential nozzle 15. The electrolytic solution supply passage 21 is connected to a liquid injection pump 22 serving as a supply source of the electrolytic solution.

The outer circumferential nozzle 15 includes two annular grooves 15d formed in an inner periphery of the outer circumferential nozzle 15, in the second end side in the axial direction. Each of the annular grooves 15d contains a seal member 23 having an annular shape. The seal member 23 is made of elastic material such as rubber, and is structured to liquid-tightly seal a gap between the inner periphery of the outer circumferential nozzle 15 and the outer periphery of the inner circumferential nozzle 16 while securing sliding contact therebetween.

The outer circumferential nozzle 15 further includes an overhang 15b in the second end side in the axial direction. The overhang 15b overhangs outward from the outer periphery of the outer circumferential nozzle 15, perpendicularly to the axial direction. The overhang 15b is structured to receive a pressing force from a rod 18a of a hydraulic actuator 18. The hydraulic actuator 18 is a linear reciprocation actuator connected to a hydraulic pump not shown. The pressing force from the hydraulic actuator 18 is exerted from the second end side in the axial direction, and causes the outer circumferential nozzle 15 to move downward together with the inner circumferential nozzle 16 and the shaft 17.

The inner circumferential nozzle 16 has the cylindrical tubular shape longer than the outer circumferential nozzle 15. The inner circumferential nozzle 16 has an inner diameter greater than an outer diameter of the shaft 17, so as to form a decompression passage 28 between the inner circumferential nozzle 16 and the shaft 17 structured to expand and contract through the inner circumferential nozzle 16. The decompression passage 28 has an annular shape, through which gas flows during evacuation for producing a vacuum. In a state that the shaft 17 is expanded, the decompression passage 28 has an inlet in the first end side in the axial direction, namely, a suction port 29. The suction port 29 has an annular shape, and is formed between the tip of the inner circumferential nozzle 16 and an outer periphery of the shaft 17. The shaft 17 includes in its tip a valve 25 having a truncated conical shape. Accordingly, the suction port 29 is opened and closed due to relative move between the inner circumferential nozzle 16 and the shaft 17. The shaft 17 includes a gas sealing member 33 that has an annular shape and is structured to, in a state that the suction port 29 is closed as shown in FIG. 3, gas-tightly seal a gap between an inner peripheral slope 24b of the inner circumferential nozzle 16 and a tapered surface 25a of the shaft 17. The inner peripheral slope 24b is formed in the diameter expansion portion 24 of the inner circumferential nozzle 16. The tapered surface 25a is formed in the valve 25 in the tip of the shaft 17. The gas sealing member 33 is made of rubber similarly to the electrolytic solution sealing member 26, and is disposed in an annular groove formed in the valve 25.

The decompression passage 28 extends from the suction port 29 to the second end side in the axial direction, so as to be longer than the electrolytic solution passage 19. The decompression passage 28 communicates with a gas discharging passage 30 defined by a projection 16 having a tubular shape projecting from the outer periphery of the inner circumferential nozzle 16. The gas discharging passage 30 is connected to a vacuum pump 31.

Similarly to the outer circumferential nozzle 15, the inner circumferential nozzle 16 includes two annular grooves 16c formed in an inner periphery of the inner circumferential nozzle 16, in the second end side in the axial direction. Each of the annular grooves 16c contains a seal member 32 having an annular shape. The seal member 32 is made of elastic material such as rubber, and is structured to gas-tightly seal a gap between the inner periphery of the inner circumferential nozzle 16 and the outer periphery of the shaft 17 so as to suppress an atmosphere from intruding into the decompression passage 28, while securing sliding contact between the inner circumferential nozzle 16 and the shaft 17.

The inner circumferential nozzle 16 further includes an overhang 16a in the second end side in the axial direction. The overhang 16a overhangs outward in the same direction with the overhang 15b of the outer circumferential nozzle 15. The overhang 16a is connected to a rod 27a of a hydraulic actuator 27 that is a linear reciprocation actuator supported by the overhang 15b. The rod 27a of the hydraulic actuator 27 is driven to cause the inner circumferential nozzle 16 to move in the axial direction, relatively with respect to the outer circumferential nozzle 15.

The shaft 17 has the cylindrical shape longer than the inner circumferential nozzle 16. The shaft 17 includes an overhang 17a formed similarly to the overhang 15b and the overhang 16a, in the second end side in the axial direction. The overhang 17a is connected to a rod 34a of a hydraulic actuator 34 that is a linear reciprocation actuator supported by the overhang 16a. The rod 34a of the hydraulic actuator 34 is driven to cause the shaft 17 to move in the axial direction, relatively with respect to the inner circumferential nozzle 16.

The primary seal mechanism 10 is disposed below the heat seal mechanism 12 as shown in FIG. 1, and is structured to establish sealing around the outer circumferential nozzle 15 by pressing the both sides of the bag-shaped laminate film exterior 4 in which the nozzle 9 is inserted. The primary seal mechanism 10 includes a pair of elastic bodies 35 and 36 structured to establish the sealing around the outer circumferential nozzle 15, and includes a pair of holders 37 and 38 structured to respectively hold the pair of elastic bodies 35 and 36.

Figure 4:
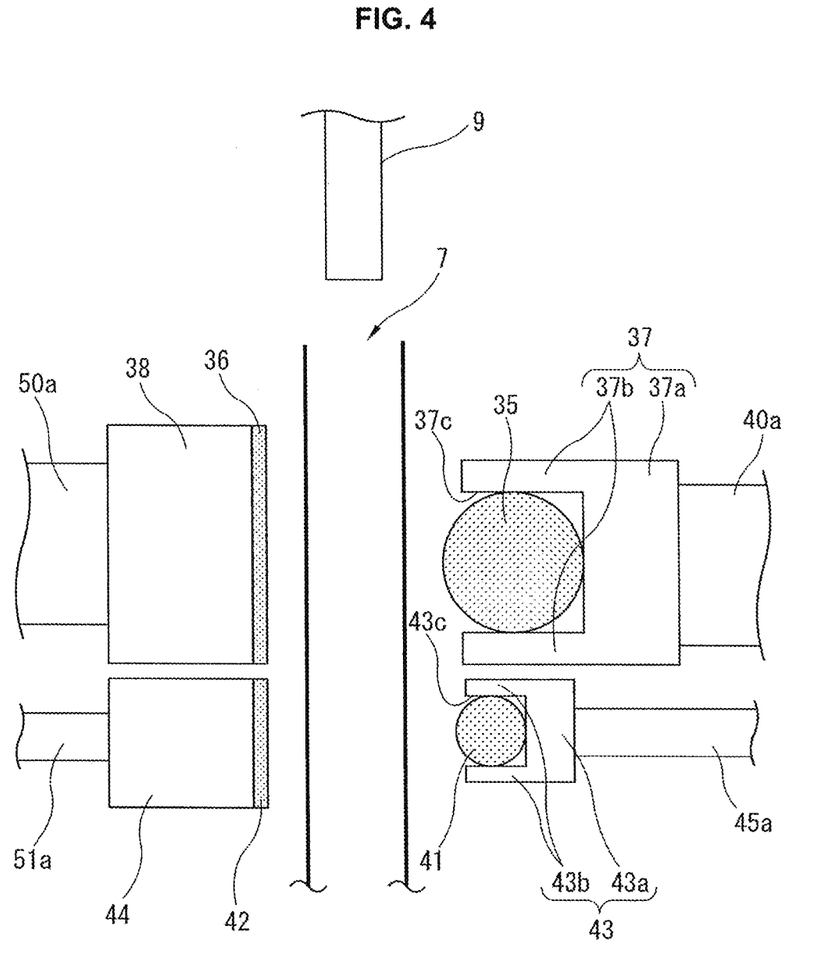
FIG. 4 is an illustrative view of the liquid injection device viewed from a front side of FIG. 1.
Figure 5:
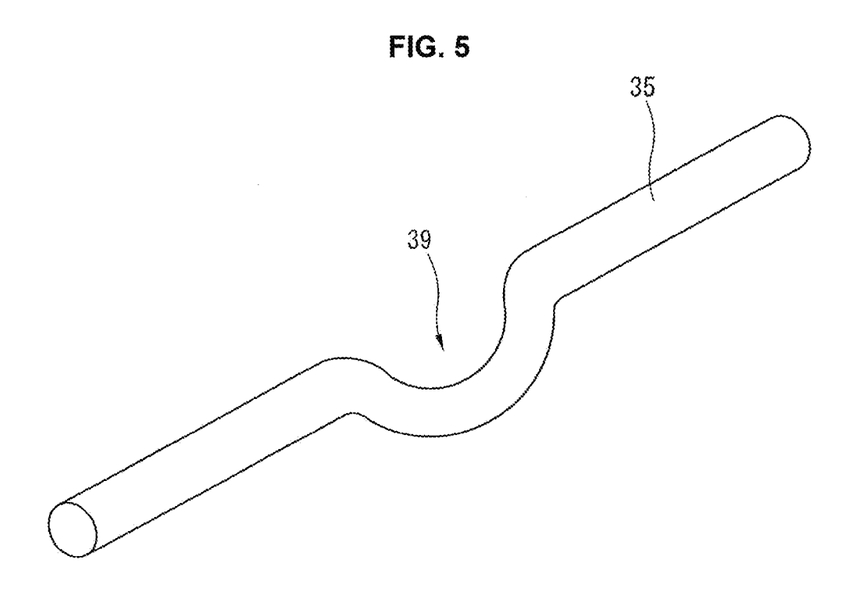
FIG. 5 is a perspective view of an elastic body employed in a primary seal mechanism.
Figure 6:
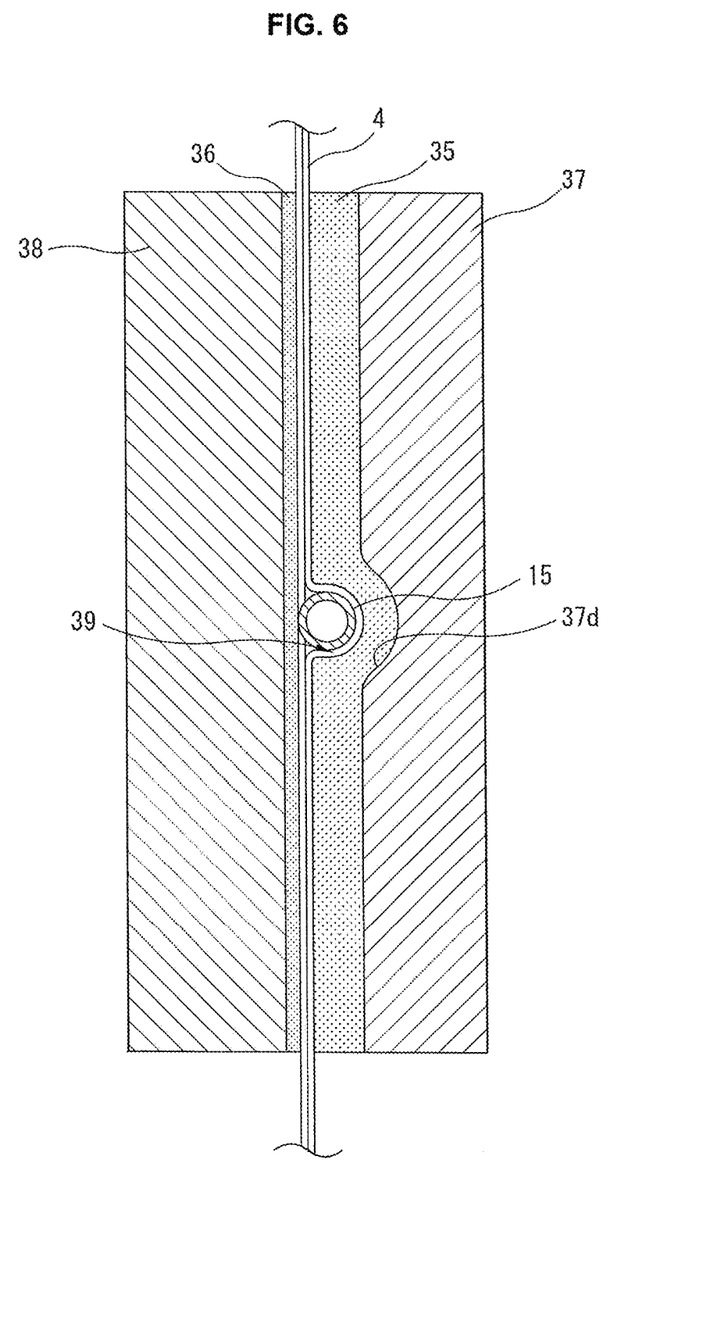
FIG. 6 is a cross sectional view of the liquid injection device along a line A-A shown in FIG. 1.

As shown in FIG. 4, the elastic body 35 is disposed in a first side with respect to the bag-shaped laminate film exterior 4 (i.e. a right side in FIG. 4), and is structured to establish the sealing around the outer circumferential nozzle 15 along a seal line L1 (see FIG. 2) crossing the nozzle 9, by pressing the opening 7 together with the nozzle 9 from the both sides of the bag-shaped laminate film exterior 4 in cooperation with the elastic body 36. The elastic body 35 is made of rubber being elastic material, such as fluoro rubber. The elastic body 35 has a shape of slender rod with a circular cross section, and has a length enough to seal the opening 7 at the upper side 4d of the bag-shaped laminate film exterior 4. As shown in FIG. 5, the elastic body 35 includes at its center a curve portion 39 having a semicircular shape curving to fit with the outer periphery of the outer circumferential nozzle 15 of the nozzle 9. As shown in FIG. 6, the curve portion 39 has a size to appropriately press the outer circumferential nozzle 15 and a part of the bag-shaped laminate film exterior 4 around the outer circumferential nozzle 15, upon pressing the opening 7 together with the outer circumferential nozzle 15 from outside of the bag-shaped laminate film exterior 4.

The holder 37 is exemplarily made of metal, and has a substantially U-shaped cross section as shown in FIG. 4. The holder 37 includes a bottom wall 37a rising vertically, and a pair of side walls 37b, 37b extending horizontally from the bottom wall 37a, parallel with each other. The bottom wall 37a and the pair of side walls 37b, 37b define a recessed groove 37c formed to contain the elastic body 35. The elastic body 35 is heat-welded or glued to the holder 37. In addition, each of the pair of side walls 37b, 37b includes a cut-out portion 37d shaped in conformance with the curve portion 39 of the elastic body 35 as shown in FIG. 6, so as to avoid interference with the outer circumferential nozzle 15.

As shown in in FIG. 4, the elastic body 36 is disposed in a second side with respect to the bag-shaped laminate film exterior 4 (i.e. a left side in FIG. 4). The elastic body 36 is made of rubber harder than that for the elastic body 35, such as silicone rubber, and has a shape of flat sheet.

The holder 38 is exemplarily made of metal, and has a cuboid shape as shown in FIG. 4 onto which the elastic body 36 is heat-welded or glued.

As shown in FIG. 1, the primary seal mechanism 10 is disposed along the seal line L1 shown in FIG. 2, and includes hydraulic actuators 40 and 50. The hydraulic actuators 40 and 50 are structured to cause the elastic bodies 35 and 36 to linearly reciprocate independently of each other, with respect to the bag-shaped laminate film exterior 4. As shown in FIG. 4, the hydraulic actuator 40 includes a rod 40a connected to the bottom wall 37a of the holder 37, and the hydraulic actuator 50 includes a rod 50a connected to the holder 38. The hydraulic actuators 40 and 50 are structured to work in coordination with each other so as to open and close the elastic bodies 35 and 36 disposed opposite to each other across the opening 7.

The primary seal mechanism 10 corresponds to a first seal mechanism in the claims.

The secondary seal mechanism 11 is disposed nearer to the generation element 3 than the primary seal mechanism 10, namely along the seal line L2 shown in FIG. 2. The secondary seal mechanism 11 is structured to prevent leakage of the electrolytic solution and intrusion of the atmosphere, by sealing the opening 7 without interposing the nozzle 9 after a process for the liquid injection. The secondary seal mechanism 11 includes a pair of elastic bodies 41 and 42 and a pair of holders 43 and 44 structured to hold the pair of elastic bodies 41 and 42.

Figure 7:
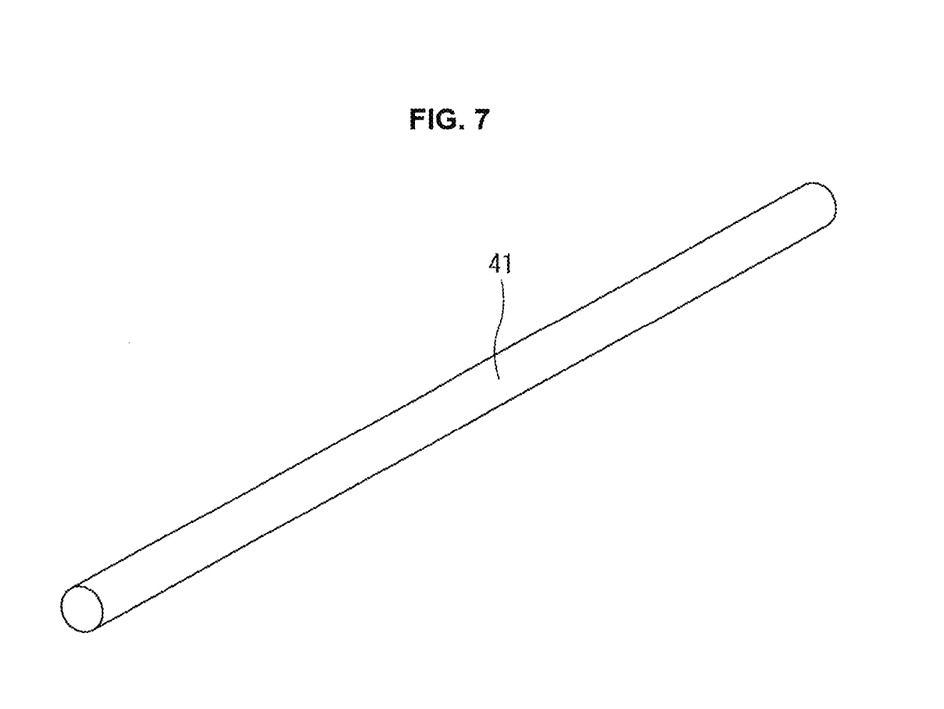
FIG. 7 is a perspective view of an elastic body employed in a secondary seal mechanism.

As shown in FIG. 4, the elastic body 41 is disposed in the first side with respect to the bag-shaped laminate film exterior 4 (i.e. the right side in FIG. 4) and below the elastic body 35, and is structured to seal the opening 7 along the seal line L2 (see FIG. 2) by pressing the opening 7 from the both sides of the bag-shaped laminate film exterior 4 in cooperation with the elastic body 42. The elastic body 41 is made of rubber same with the elastic body 35, such as the fluoro rubber, and has a hardness same with the elastic body 35. As shown in FIG. 7, the elastic body 41 has a slender cylindrical shape, and has a length enough to seal the opening 7 at the upper side 4d of the bag-shaped laminate film exterior 4, similarly to the elastic body 35.

The holder 43 is exemplarily made of metal, and, as shown in FIG. 4, has a substantially U-shaped cross section. The holder 43 is configured similarly to the holder 37, and includes a bottom wall 43a, a pair of side walls 43b, 43b, and a recessed groove 43c defined by the bottom wall 43a and the pair of side walls 43b, 43b. The recessed groove 43c contains the elastic body 41 that is heat-welded or glued to the recessed groove 43c.

The elastic body 42 is made of rubber same with the elastic body 36, and has a shape of flat sheet.

The holder 44 has a cuboid shape similar to the holder 38, onto which the elastic body 42 is heat-welded or glued.

As shown in FIG. 1, the secondary seal mechanism 11 includes hydraulic actuators 45 and 51. The hydraulic actuators 45 and 51 respectively include rods 45a and 51a (see FIG. 4) structured to open and close the elastic bodies 41 and 42 disposed opposite to each other across the opening 7.

The secondary seal mechanism 11 corresponds to a second seal mechanism in the claims.

The heat seal mechanism 12 includes a pair of seal heaters 46, 46 structured to heat-seal the opening 7 of the bag-shaped laminate film exterior 4 after the injection of electrolytic solution. The pair of seal heaters 46, 46 are configured substantially same with each other, and are disposed above the primary seal mechanism 10 as shown in FIG. 1. For example, each of the pair of seal heaters 46, 46 has a block-like shape, and is made of metal sufficient in thermal conductivity, and internally includes a heat source such as a hot wire. Furthermore, each of the pair of seal heaters 46, 46 is connected to an actuator not shown, in order to open and close interposing the opening 7.

Upon use of thus-configured liquid injection device 2, the tip of the nozzle 9 is caused to move downward due to action of the hydraulic actuator 18 and is inserted into the opening 7, with the bag-shaped laminate film exterior 4 inserted in the insertion hole 14 in the attitude that the opening 7 opens upward as shown in FIG. 1. Then, the pair of elastic bodies 35 and 36 are caused to approach each other due to action of the hydraulic actuators 40 and 50, so as to press from the both sides the bag-shaped laminate film exterior 4 in which the nozzle 9 is inserted. Thus, the elastic bodies 35 and 36 establish the sealing around the outer circumferential nozzle 15 together with the bag-shaped laminate film exterior 4.

Figure 8A:
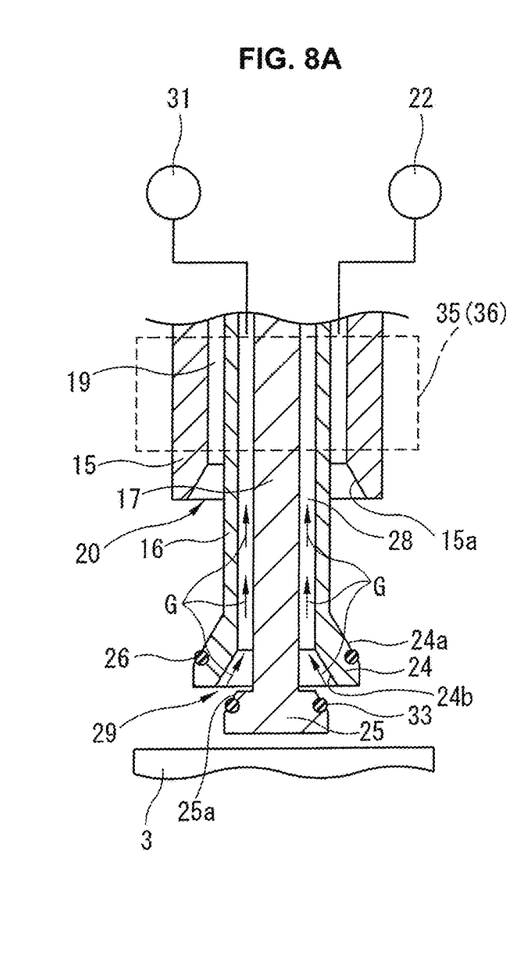
FIG. 8A is an illustrative view of a process for evacuation in the bag-shaped laminate film exterior.
Figure 8B:
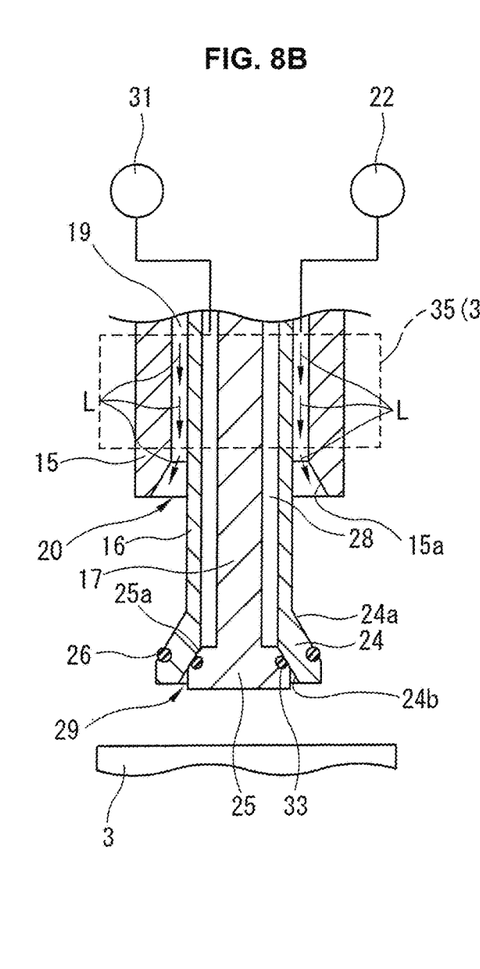
FIG. 8B is an illustrative view of a process for liquid injection into the bag-shaped laminate film exterior.
Figure 8C:
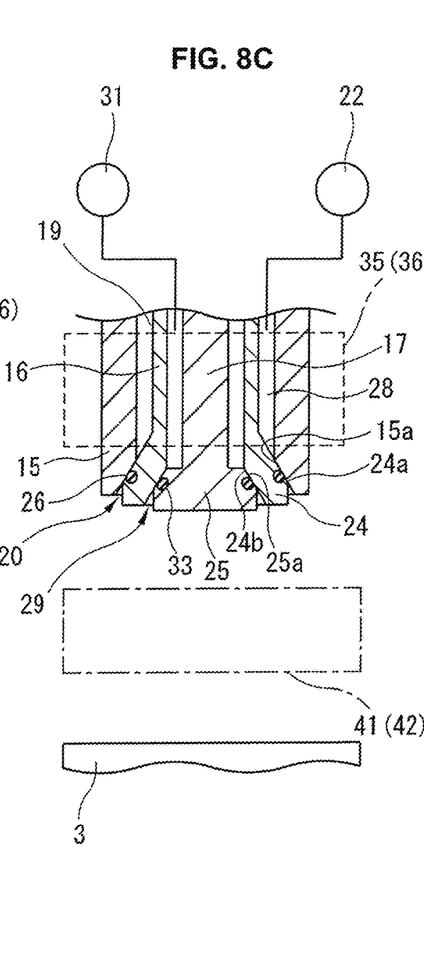
FIG. 8C is an illustrative view of a process for seal of the bag-shaped laminate film exterior after the liquid injection.

Next, the following describes an evacuation process, a liquid injection process, and a seal process of the bag-shaped laminate film exterior 4, with reference to FIGS. 8A, 8B, and 8C.

In FIGS. 8A, 8B, and 8C, the nozzle 9 is already inserted in the bag-shaped laminate film exterior 4. Each broken line in the drawings represents the pair of elastic bodies 35 and 36 pressing the bag-shaped laminate film exterior 4 from the both sides at a position of the seal line L1 (see FIG. 2) with the outer circumferential nozzle 15 inserted in the bag-shaped laminate film exterior 4. In FIG. 8C, a dash-dot line represents the pair of elastic bodies 41 and 42 sealing the bag-shaped laminate film exterior 4 at a position of the seal line L2 (see FIG. 2).

As shown in FIG. 8A, in the evacuation process, the inner circumferential nozzle 16 is caused to project to the first end side in the axial direction with respect to the outer circumferential nozzle 15, due to action of the hydraulic actuator 27. After the inner circumferential nozzle 16 has projected, as shown in FIG. 8A, the annular liquid injection port 20 between the tip of the outer circumferential nozzle 15 and the outer periphery of the inner circumferential nozzle 16 is open. Furthermore, the diameter expansion portion 24 of the inner circumferential nozzle 16 is at a position protuberant to the first end side in the axial direction with respect to the liquid injection port 20.

Then, while maintaining the diameter expansion portion 24 protuberant to the first end side in the axial direction, the shaft 17 is caused to project to the first end side in the axial direction with respect to the inner circumferential nozzle 16. After the shaft 17 has projected, the annular suction port 29 between the diameter expansion portion 24 and the outer periphery of the 17 is open. Furthermore, the valve 25 is at a position protuberant to the first end side in the axial direction with respect to the diameter expansion portion 24. Thus, the suction port 29 at the tip of the inner circumferential nozzle 16 opens in the bag-shaped laminate film exterior 4, at a position protuberant to the first end side in the axial direction with respect to the liquid injection port 20 of the outer circumferential nozzle 15. In addition, the valve 25 at the protuberant position is in a vicinity of an edge of the generation element 3.

Next, as shown by arrows G in FIG. 8A, the vacuum pump 31 evacuates gas inside the bag-shaped laminate film exterior 4, i.e. produces a vacuum in the bag-shaped laminate film exterior 4, through the suction port 29 and the decompression passage 28.

As shown in FIG. 8B, in the liquid injection process subsequent to the evacuation process, the shaft 17 is retracted upward with respect to the inner circumferential nozzle 16, due to action of the hydraulic actuator 34. Thus, as shown in FIG. 8B, the suction port 29 of the inner circumferential nozzle 16 is closed from outside by the valve 25, and the gap between the tapered surface 25a and the inner peripheral slope 24b is gas-tightly sealed by the gas sealing member 33.

Then, as shown by arrows L in FIG. 8B, the electrolytic solution is injected into the bag-shaped laminate film exterior 4 through the electrolytic solution passage 19 and the liquid injection port 20, by operating the liquid injection pump 22 with the suction port 29 closed by the valve 25.

As shown in FIG. 8C, in the seal process subsequent to the liquid injection process, the inner circumferential nozzle 16 is retracted upward together with the shaft 17 from the axial position shown in FIG. 8B, due to action of the hydraulic actuator 27. The retraction of the inner circumferential nozzle 16 causes the liquid injection port 20 of the outer circumferential nozzle 15 to be closed by the diameter expansion portion 24 of the inner circumferential nozzle 16 as shown in FIG. 8C, and causes the gap between the slope 15a and the outer peripheral slope 24a to be liquid-tightly sealed by the electrolytic solution sealing member 26.

Then, with the liquid injection port 20 and the suction port 29 closed, the opening 7 of the bag-shaped laminate film exterior 4 is sealed at the position of the seal line L2 by the pair of elastic bodies 41 and 42.

Next, while maintaining the pair of elastic bodies 41 and 42 sealing the opening 7 of the bag-shaped laminate film exterior 4, the pair of elastic bodies 35 and 36 are retracted away from the bag-shaped laminate film exterior 4, and subsequently the nozzle 9 is extracted from the opening 7.

Subsequently to the seal process shown in FIG. 8C, a heat seal process is implemented to heat the bag-shaped laminate film exterior 4 from the both sides at a position above the seal line L1 shown in FIG. 2, by the pair of seal heaters 46, 46. This causes the bag-shaped laminate film exterior 4 to be heat-sealed along the upper side 4d shown in FIG. 2.

As described above, the present embodiment is configured such that during the evacuation in the bag-shaped laminate film exterior 4, the suction port 29 in the tip of the inner circumferential nozzle 16 is open inside the bag-shaped laminate film exterior 4, at the position protuberant in the axial direction with respect to the liquid injection port 20 of the outer circumferential nozzle 15. In other words, the inner circumferential nozzle 16 is inserted in the bag-shaped laminate film exterior 4 deeply to reach the vicinity of the generation element 3 such that the suction port 29 is positioned in the vicinity of the edge of the generation element 3. Since upon the evacuation the inner circumferential nozzle 16 is expanded inside of the bag-shaped laminate film exterior 4 such that the suction port 29 is positioned in the vicinity of the edge of the generation element 3, the evacuation in the bag-shaped laminate film exterior 4 is certainly performed via the suction port 29.

If a nozzle is formed as a single pipe and is deeply inserted into a bag-shaped laminate film exterior upon evacuation, the bag-shaped laminate film exterior may be deteriorate in sealability because the nozzle needs to be extracted through a long distance after the evacuation.

In contrast, according to the present embodiment, the outer circumferential nozzle 15, around which the seal is established by the elastic bodies 35 and 36, does not need to be deeply inserted into the bag-shaped laminate film exterior 4. This serves to suppress the bag-shaped laminate film exterior 4 from deteriorating in sealability due to the retraction of the nozzle 9.

Moreover, according to the present embodiment, the suction port 29 of the inner circumferential nozzle 16 is opened and closed by the valve 25 disposed in the tip of the shaft 17, wherein the suction port 29 is closed by the valve 25 during the liquid injection. This serves to certainly insulate the decompression passage 28 from the electrolytic solution passage 19 during the liquid injection.

Furthermore, according to the present embodiment, the liquid injection device 2 includes two seal mechanisms: the primary seal mechanism 10 and the secondary seal mechanism 11. After the evacuation, the nozzle 9 is extracted from the opening 7 of the bag-shaped laminate film exterior 4 subsequently to release of the seal of the pair of elastic bodies 35 and 36 while maintaining the pair of elastic bodies 41 and 42 sealing the opening 7. This serves to secure the bag-shaped laminate film exterior 4 in sealability by the pair of elastic bodies 41 and 42, and thereby suppress the bag-shaped laminate film exterior 4 from deteriorating in sealability due to the extraction of the nozzle 9.

Furthermore, according to the present embodiment, the elastic bodies 35 and 36 are configured to establish sealing around only one nozzle, i.e. around the outer circumferential nozzle 15. This serves to facilitate extracting the outer circumferential nozzle 15 in comparison with a case of extracting one liquid injection nozzle and one evacuation nozzle around which sealing is established by a pair of elastic bodies.

In addition, although the above embodiment exemplarily employs the bag-shaped laminate film exterior 4 formed by superposing two rectangle laminate films to each other and then respectively heat-welding three sides thereof, the present invention may alternatively employ a bag-shaped film exterior formed by folding one rectangle laminate film in two and then respectively heat-welding two sides perpendicular to a folded side of the bag-shaped film exterior.

Moreover, although the above embodiment exemplarily employs the film exterior battery 1 structured such that the cathode tab 5 is led outside from the side 4a of the bag-shaped laminate film exterior 4 and the anode tab 6 is led outside from the side 4b of the bag-shaped laminate film exterior 4, the present invention may be applied in order to alternatively employ a film exterior battery 1 structured such that the cathode tab 5 and the anode tab 6 are led outside from a common one side.

Furthermore, although the above embodiment is exemplarily configured to dispose the bag-shaped laminate film exterior 4 in the attitude that the opening 7 of the bag-shaped laminate film exterior 4 opens upward, the bag-shaped laminate film exterior 4 may be disposed in another attitude.

DESCRIPTION OF THE SIGNS

2 . . . liquid injection device
4 . . . bag-shaped laminate film exterior
9 . . . nozzle
10 . . . primary seal mechanism
11 . . . secondary seal mechanism
15 . . . outer circumferential nozzle
16 . . . inner circumferential nozzle
17 . . . shaft
19 . . . electrolytic solution passage
20 . . . liquid injection port
25 . . . valve
28 . . . decompression passage
29 . . . suction port

The invention claimed is:

1. A liquid injection device for injection of electrolytic solution into a bag-shaped film exterior containing a generation element, the liquid injection device comprising:
a nozzle structured such that the electrolytic solution is injected into the bag-shaped film exterior through the nozzle; and
a first seal mechanism including a pair of elastic bodies structured to press the bag-shaped film exterior with the nozzle which is configured to be inserted in the bag-shaped film exterior, and thereby establish sealing around the nozzle;
wherein:
the nozzle includes an outer circumferential nozzle-shaped tubular and structured such that the first seal mechanism establishes sealing around the outer circumferential nozzle inserted into the bag-shaped film exterior, and includes an inner circumferential nozzle shaped tubular and structured expandable telescopically through the outer circumferential nozzle;
the outer circumferential nozzle and the inner circumferential nozzle form therebetween an electrolytic solution passage structured such that the electrolytic solution flows through the electrolytic solution passage;
the inner circumferential nozzle forms therein a decompression passage structured such that gas inside the bag-shaped film exterior is evacuated through the decompression passage;
the outer circumferential nozzle includes a liquid injection port, and the inner circumferential nozzle includes a suction port; and
in a state that the inner circumferential nozzle is expanded telescopically through the outer circumferential nozzle inside of the bag-shaped film exterior, the suction port opens at a position protuberant with respect to the liquid injection port in an axial direction of the outer circumferential nozzle.

2. The liquid injection device as claimed in claim 1, wherein:
the nozzle further includes a shaft structured expandable telescopically through the inner circumferential nozzle; and
the shaft includes at an end thereof a valve structured to open and close the suction port.

3. The liquid injection device as claimed in claim 2, the liquid injection device further comprising:
a second seal mechanism that includes a pair of elastic bodies and is disposed nearer to the generation element than the first seal mechanism.

4. The liquid injection device of claim 2, wherein in a state that the shaft is expanded, the suction port opens.

5. The liquid injection device of claim 4, wherein the valve is at a position protuberant to a tip of the expanded inner circumferential nozzle.

6. The liquid injection device as claimed in claim 1, the liquid injection device further comprising:
a second seal mechanism that includes a pair of elastic bodies and is disposed nearer to the generation element than the first seal mechanism.

7. The liquid injection device of claim 1, wherein the outer circumferential nozzle has an inner diameter greater than an outer diameter of the inner circumferential nozzle.

8. The liquid injection device of claim 7, wherein the electrolytic solution passage formed between the outer circumferential nozzle and the inner circumferential nozzle communicates with an electrolytic solution supply passage and the decompression passage formed in the inner circumferential nozzle communicates with a gas discharging passage.

9. A liquid injection method for injection of electrolytic solution through a nozzle into a bag-shaped film exterior containing a generation element, wherein the nozzle includes an outer circumferential nozzle shaped tubular and an inner circumferential nozzle shaped tubular and structured expandable telescopically through the outer circumferential nozzle, the liquid injection method comprising:
  inserting a tip of the outer circumferential nozzle into an opening of the bag-shaped film exterior;
  establishing sealing around the outer circumferential nozzle together with the bag-shaped film exterior by a seal mechanism;
  positioning a suction port of the inner circumferential nozzle to be protuberant with respect to a liquid injection port of the outer circumferential nozzle in an axial direction of the outer circumferential nozzle;
  evacuating gas inside the bag-shaped film exterior via the suction port of the inner circumferential nozzle, through a decompression passage formed in the inner circumferential nozzle; and
  injecting the electrolytic solution into the bag-shaped film exterior via the liquid injection port of the outer circumferential nozzle, through an electrolytic solution passage formed between the outer circumferential nozzle and the inner circumferential nozzle inserted in the bag-shaped film exterior.

10. The liquid injection method of claim 9, wherein the outer circumferential nozzle has an inner diameter greater than an outer diameter of the inner circumferential nozzle so that the electrolytic solution passage formed between the outer circumferential nozzle and the inner circumferential nozzle.

11. The liquid injection method of claim 10, wherein the seal mechanism includes a first seal mechanism and a second seal mechanism,
  the first seal mechanism includes a first pair of elastic bodies structured to press the bag-shaped film exterior with the outer circumferential nozzle and the second seal mechanism includes a pair of second elastic bodies.

12. The liquid injection method of claim 11, wherein the evacuating gas inside the bag-shaped film exterior via the suction port of the inner circumferential nozzle, further includes:
  positioning an end of a shaft, which is structured expandable telescopically through the inner circumferential nozzle, to be protuberant with respect to a tip of the inner circumferential nozzle so that the suction port opens.

13. The liquid injection method of claim 12, wherein the injecting the electrolytic solution into the bag-shaped film exterior via the liquid injection port of the outer circumferential nozzle, further includes:
  retracting the shaft upward with respect to the inner circumferential nozzle so that the suction port is closed.

14. The liquid injection method of claim 13, comprising:
  retracting the inner circumferential nozzle expanded telescopically through the outer circumferential nozzle upward together with the shaft so that the liquid injection port is closed.

15. The liquid injection method of claim 14, further comprising:
  sealing the opening of the bag-shaped film exterior by the second pair of elastic bodies; and
  retracting the first pair of elastic bodies and extracting the nozzle from the opening of the bag-shaped film exterior.

* * * * *